United States Patent
Kim et al.

(10) Patent No.: US 12,527,545 B2
(45) Date of Patent: Jan. 20, 2026

(54) POSITION TRACKING-TYPE ULTRASONIC BLOOD FLOW MONITORING APPARATUS

(71) Applicant: POSTECH RESEARCH AND BUSINESS DEVELOPMENT FOUNDATION, Pohang-si (KR)

(72) Inventors: Hyung Ham Kim, Pohang-si (KR); Yeonggeun Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/723,846

(22) PCT Filed: Dec. 2, 2022

(86) PCT No.: PCT/KR2022/019450
§ 371 (c)(1),
(2) Date: Jun. 24, 2024

(87) PCT Pub. No.: WO2023/128339
PCT Pub. Date: Jul. 6, 2023

(65) Prior Publication Data
US 2025/0064427 A1     Feb. 27, 2025

(30) Foreign Application Priority Data

Dec. 27, 2021 (KR) .................. 10-2021-0188592
May 17, 2022 (KR) .................. 10-2022-0060441

(51) Int. Cl.
*A61B 8/00*     (2006.01)
*A61B 8/06*     (2006.01)
*A61B 8/08*     (2006.01)

(52) U.S. Cl.
CPC ............. *A61B 8/4236* (2013.01); *A61B 8/06* (2013.01); *A61B 8/085* (2013.01); *A61B 8/54* (2013.01); *A61B 8/488* (2013.01)

(58) Field of Classification Search
CPC ......... A61B 8/4236; A61B 8/06; A61B 8/085; A61B 8/54; A61B 8/488; A61B 8/4444;
(Continued)

(56) References Cited

U.S. PATENT DOCUMENTS

2017/0105700 A1*  4/2017  Bar-Zion ............ A61B 8/0891
2019/0261942 A1*  8/2019  Yang .................... A61B 8/5207
2020/0015780 A1*  1/2020  Geelen ................ A61B 8/4236

FOREIGN PATENT DOCUMENTS

JP      2021-118892 A      8/2021
KR      10-1816090 B1      1/2018
(Continued)

OTHER PUBLICATIONS

International Search Report of Application No. PCT/KR2022/019450, dated Mar. 23, 2023, 5 pages including English translation.

*Primary Examiner* — Kaitlyn E Sebastian
(74) *Attorney, Agent, or Firm* — Morgan, Lewis & Bockius LLP (57) ABSTRACT

The present invention relates to a position tracking-type ultrasonic blood flow monitoring apparatus that can continuously track the position of a blood vessel by adjusting the rotation angle of an ultrasonic probe module according to the position change of the blood vessel. The present invention may provide a blood flow monitoring apparatus comprising a housing having an opening formed at a bottom surface thereof; a first rotation member rotating around a first axis in the housing; a second rotation member mounted to the first rotation member and rotating around a second shaft; and a probe module mounted to the second rotation member, wherein the probe module rotates together with the
(Continued)

first rotation member and the second rotation member according to the rotation of the first rotation member and the second rotation member, and can transmit and receive an ultrasonic signal.

17 Claims, 8 Drawing Sheets

(58) Field of Classification Search
CPC ... A61B 8/4461; A61B 8/4472; A61B 8/4488; A61B 8/5223; A61B 8/0891
See application file for complete search history.

(56) References Cited

FOREIGN PATENT DOCUMENTS

| | | |
|---|---|---|
| KR | 10-2146953 B1 | 8/2020 |
| KR | 10-2215276 B1 | 2/2021 |

* cited by examiner

POSITION TRACKING-TYPE ULTRASONIC BLOOD FLOW MONITORING APPARATUS

TECHNICAL FIELD

The present disclosure relates to an ultrasonic blood flow monitoring apparatus that is able to continuously track the position of a blood vessel by adjusting the rotation angle of an ultrasonic probe module according to the position change of the blood vessel.

BACKGROUND ART

Generally, soft tissue reconstruction includes skin grafting, local flaps, regional flaps, and free flaps. Among these, free flaps are applied to large defects, complex soft tissue defects, or cases in which the local flaps have failed, wherein the skin is cut from the body to a required size and is reconstructed in a skin defect area. A flap refers to skin or composite tissue that is transferred from a donor area to a recipient area while maintaining blood supply to the transferred tissue so that the transferred tissue is viable. Unlike simple skin grafting, removing the flesh along with a blood vessel and nerves and transplanting them to a required area is called a free flap. When treating bone, soft tissue, and skin defects caused by actual external injury or cancer surgery, autologous tissue grafting using the free flap is used. Recently, the number of surgical procedures has been increasing rapidly due to the development of surgical techniques and increased demand (approximately 2,000 cases in 2015 and approximately 2,600 cases in 2016 in Korea). Recently, more surgical procedures are being performed due to an increase in breast cancer diagnoses and prophylactic mastectomies, skin layer defects due to burns, increased demand for reconstruction after excision of skin layer patients due to breast reconstruction, and insurance coverage for breast cancer. This is common not only domestically but also globally. Even in cases of skin tissue that is not healed naturally, such as defects, skin tissue defects due to diabetic complications, or skin tissue defects due to bedsores, skin layer grafting is performed by using a flap technique. For the viability of skin, blood is required to be supplied through the blood vessel of the tissue by creating anastomoses, and monitoring of a surgical progress must continue for at least 3 days after the surgery.

DISCLOSURE

Technical Problem

However, a conventional blood monitoring technology has a problem in that it cannot maintain optimal Doppler signal sensitivity when the movement of a blood vessel occurs since an ultrasonic probe is fixed.

Accordingly, the present disclosure is intended to provide a position tracking-type ultrasonic blood flow monitoring apparatus that is capable of rotating a probe module in three axes so that the direction of blood flow and the direction of an ultrasonic signal maintain a specific angle therebetween after acquiring accurate position information of a blood vessel by tracking the position of the blood vessel in real time even if the movement of the blood vessel occurs.

Technical Solution

In order to accomplish the above objectives, the present disclosure provides a blood flow monitoring apparatus including a housing having an opening formed in a lower surface thereof; a first rotation member configured to rotate about a first axis inside the housing; a second rotation member mounted to the first rotation member and configured to rotate about a second axis; and a probe module mounted to the second rotation member, wherein the probe module rotates together with the first rotation member and the second rotation member according to the rotations of the first rotation member and the second rotation member and is capable of transmitting and receiving ultrasonic signals.

In addition, the blood flow monitoring apparatus may further include a patch part, wherein the patch part may be attachable to skin, and the housing may be coupled to the patch part and be rotatable about a third axis.

In addition, the first axis, the second axis, and the third axis may be perpendicular to each other, and the housing, the first rotation member, and the second rotation member may be capable of rotating independently of each other.

In addition, the blood flow monitoring apparatus may further include a control part, wherein the control part may be capable of controlling rotation angles of the housing, the first rotation member, and the second rotation member.

In addition, the first rotation member may include a first rotating ring and a first rotation axis member, and the housing may have a first axial hole formed therein, wherein a first end of the first rotation axis member may be connected to one side of the first rotating ring, and a second end thereof may be coupled to the first axial hole.

In addition, the second rotation member may include a rotating plate and a second rotation axis member, wherein the second rotating ring may be arranged inside the first rotating ring, the first rotating ring may have a second axial hole formed therein, and the second rotation axis member may be formed on one side of the rotating plate and be coupled to the second axial hole.

In addition, a direction in which the second rotation axis member is arranged may be orthogonal to a direction in which the first rotation axis member is arranged.

In addition, the housing may have a first long hole formed in a vertical direction of the housing, and the second rotation axis member may protrude through the first long hole, wherein the second rotation axis member may be capable of sliding in the first long hole.

In addition, a second manipulation member may be formed on an end part of the second rotation axis member.

In addition, the blood flow monitoring apparatus may further include an operation part, wherein the operation part may include a control part and a communication part, wherein the control part may control rotation angles of the housing, the first rotation member, and the second rotation member, and the communication part may be capable of transmitting, by wire or wirelessly, data on the ultrasonic signals received by the probe module.

According to another embodiment of the present disclosure, there is provided a blood flow monitoring system including the blood flow monitoring apparatus and a display on which an application is installed, wherein the blood flow monitoring apparatus further includes an operation part, wherein the operation part comprises a control part and a communication part, wherein the control part controls rotation angles of the housing, the first rotation member, and the second rotation member, and the communication part is capable of transmitting, by wire or wirelessly, data on ultrasonic signals received by the probe module, wherein the application receives the data on the ultrasound signals transmitted by the communication part and outputs ultrasound cross-sectional images and Doppler images on the display.

In addition, the application may store deep learning-based object recognition learning results for a blood vessel and may be capable of performing an object recognition function for the blood vessel in the ultrasound cross-sectional images and Doppler images.

In addition, the application may transmit position information about the blood vessel recognized from the ultrasound cross-sectional images and Doppler images to the communication part, and the control part may control a rotation angle of the probe module through the transmitted position information about the blood vessel.

Advantageous Effects

The position tracking-type ultrasonic blood flow monitoring apparatus according to the present disclosure can detect the position of a blood vessel, which is movable, in real time and adjust the rotation angle of an ultrasonic probe module to obtain an optimal Doppler signal and an ultrasound cross-sectional image.

In addition, data on a bloodstream and a blood vessel observed through the ultrasonic probe module are output wirelessly through a display, so the blood flow monitoring apparatus can be easily carried and used, and can obtain information on the bloodstream and blood vessel of a test subject without constraint of time and space.

MODE FOR INVENTION

The present disclosure described below may be subject to various changes and may have various embodiments, and specific embodiments will be illustrated in the drawings and described in detail. However, this is not intended to limit the present disclosure described below to specific embodiments, and it should be understood that the present disclosure includes all changes, equivalents, and substitutes included in the spirit and scope of the technology to be described below.

FIGS. 1 to 11 illustrate the configuration of a blood flow monitoring apparatus 10 according to an embodiment of the present disclosure. Hereinafter, the present disclosure will be described in more detail with reference to the attached drawings to aid understanding of the present disclosure. However, the following embodiments are provided only to make understanding the present disclosure easier, and the content of the present disclosure is not limited by the following embodiments.

Figure 1:
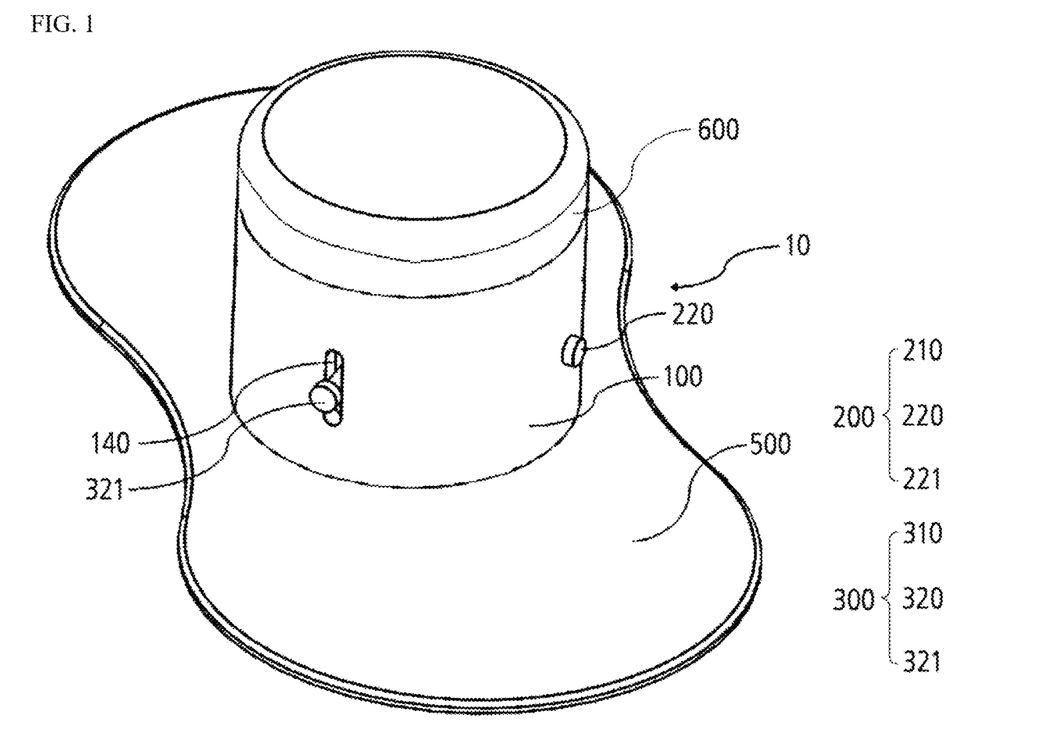
FIG. 1 is a perspective view of the blood flow monitoring apparatus according to an embodiment of the present disclosure.
Figure 2:
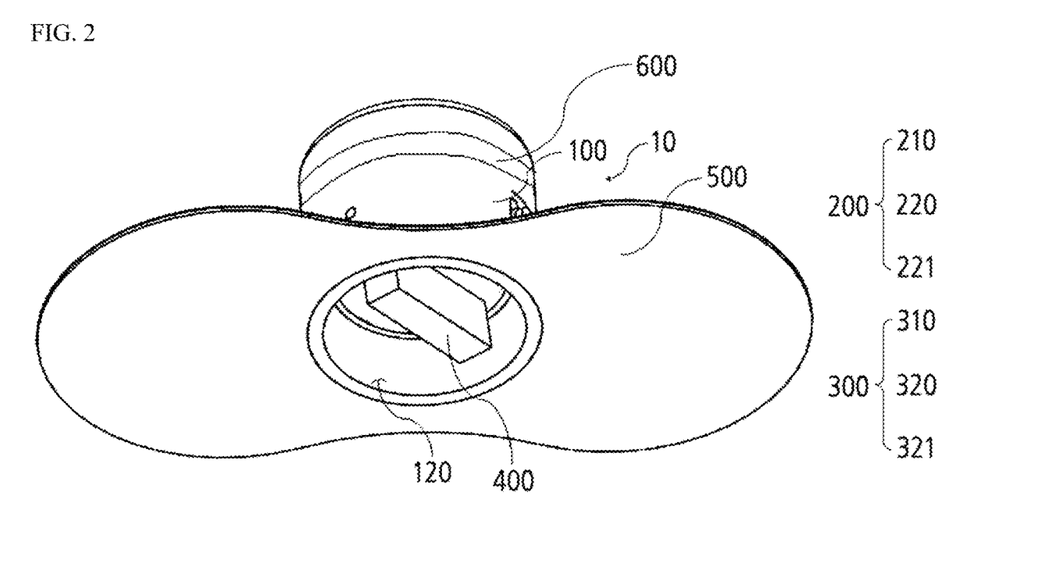
FIG. 2 is a perspective view of the blood flow monitoring apparatus according to an embodiment of the present disclosure.

FIGS. 1 and 2 are schematic illustrations of the blood flow monitoring apparatus 10 according to an embodiment of the present disclosure. Referring to FIGS. 1 and 2, the blood flow monitoring apparatus 10 may include a housing 100, a first rotation member 200, a second rotation member 300, a probe module 400, a patch part 500, and a control part 600.

Referring to FIGS. 1 to 10, the housing 100 may include the first rotation member 200, the second rotation member 300, and the probe module 400. The first rotation member 200, the second rotation member 300, and the probe module 400 may be accommodated inside the housing 100.

The housing 100 may have, for example, the shape of a cylinder or a polygonal pillar, and may preferably be formed in a cylindrical shape.

The housing 100 may have space defined therein. The housing 100 may have an opening 120 formed in a lower surface thereof, with the opening communicating with the internal space of the housing 100.

The first rotation member 200, the second rotation member 300, and the probe module 400 may be arranged in the space defined inside the housing 100.

A first axial hole 130 and a first long hole 140 may be formed on the side surface of the housing 100.

The first axial hole 130 may be coupled to a first rotation axis member 220 of the first rotation member 200, and support the first rotation member 200. The first rotation axis member 220 may be arranged to penetrate the first axial hole 130.

The first axial hole 130 may include a plurality of first axial holes formed in the side surface of the housing 100, wherein the plurality of first axial hole 130 may be symmetrically arranged on a first side surface and a second side surface of the housing 100.

The first long hole 140 may be a hole formed long on the side surface of the housing 100 in the vertical direction of the housing 100.

A second rotation axis member 310 of the second rotation member 300 may be inserted into the first long hole 140 and protrude out of the housing 100, wherein the second rotation axis member 310 may slide along the longitudinal direction of the first long hole 140. The first long hole 140 may allow the second rotation member 300 to rotate in the same direction as the rotation direction of the first rotation member 200 as the first rotation member 200 rotates about the first rotation axis member 210.

A second axial hole 140 may be formed in the side surface of the housing 100 in a direction perpendicular to a position at which the first axial hole 130 is formed. Accordingly, an imaginary extension line perpendicular to the first axial hole 130 may be orthogonal to an imaginary extension line perpendicular to the second axial hole 140.

The housing 100 may rotate about a third axis, which is the vertical central axis of the housing 100. The lower end part of the housing 100 is coupled to the patch part 500, and the housing 100 may rotate about the third axis with respect to the patch part 500.

Figure 3:
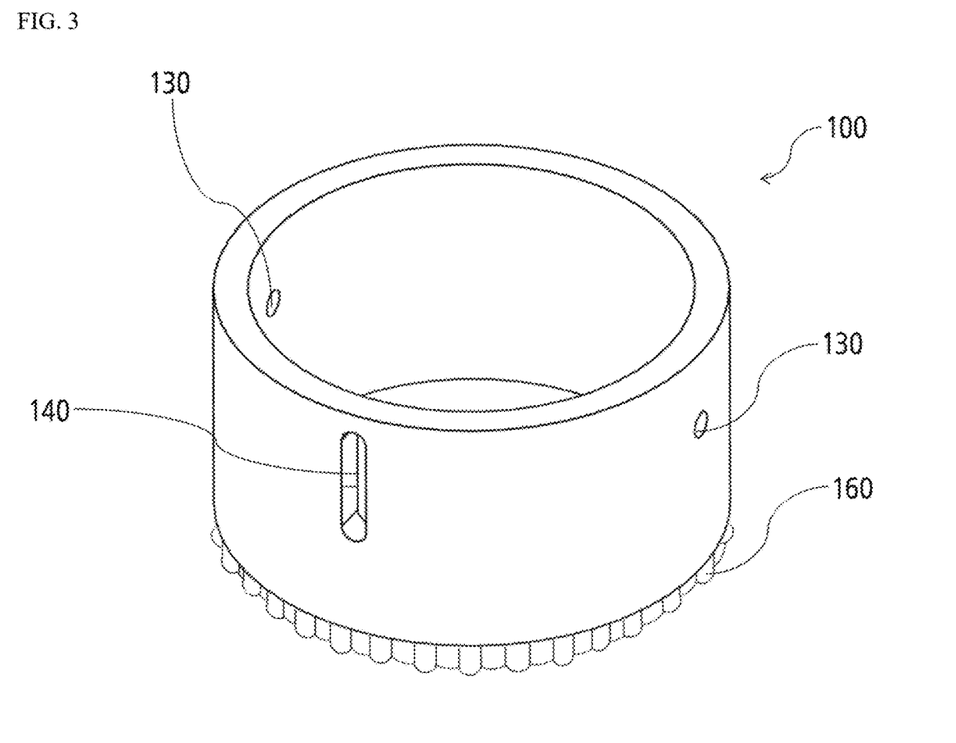
FIG. 3 illustrates the shape of housing in the present disclosure.
Figure 4:
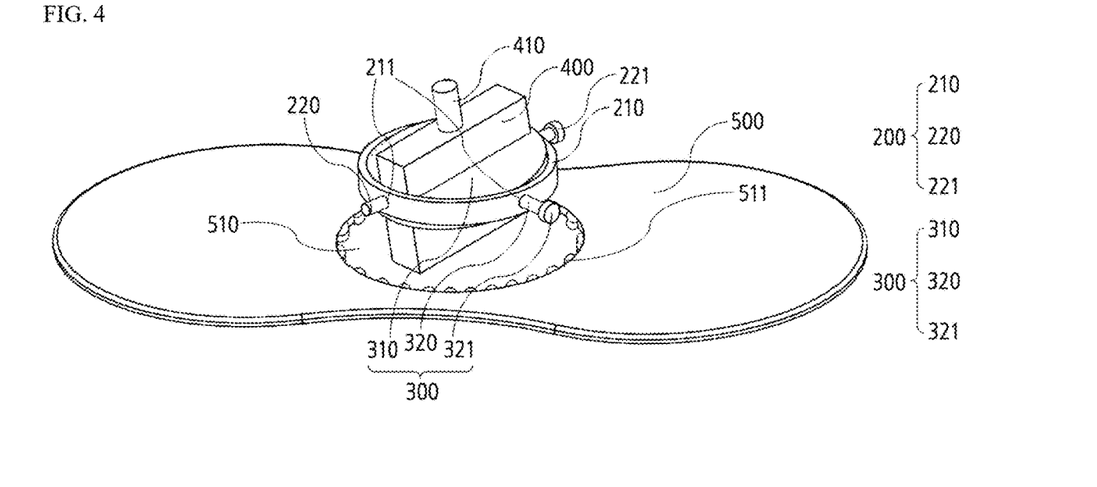
FIG. 4 illustrates the blood flow monitoring apparatus of the present disclosure from which the housing, an operation part, and a patch adapter are removed.
Figure 5:
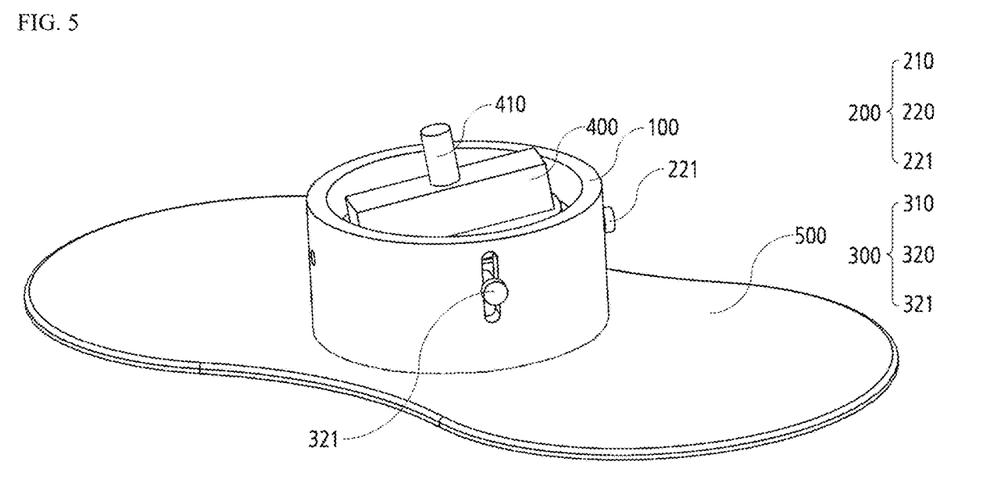
FIG. 5 illustrates the blood flow monitoring apparatus of the present disclosure from which the operation part is removed.
Figure 6:
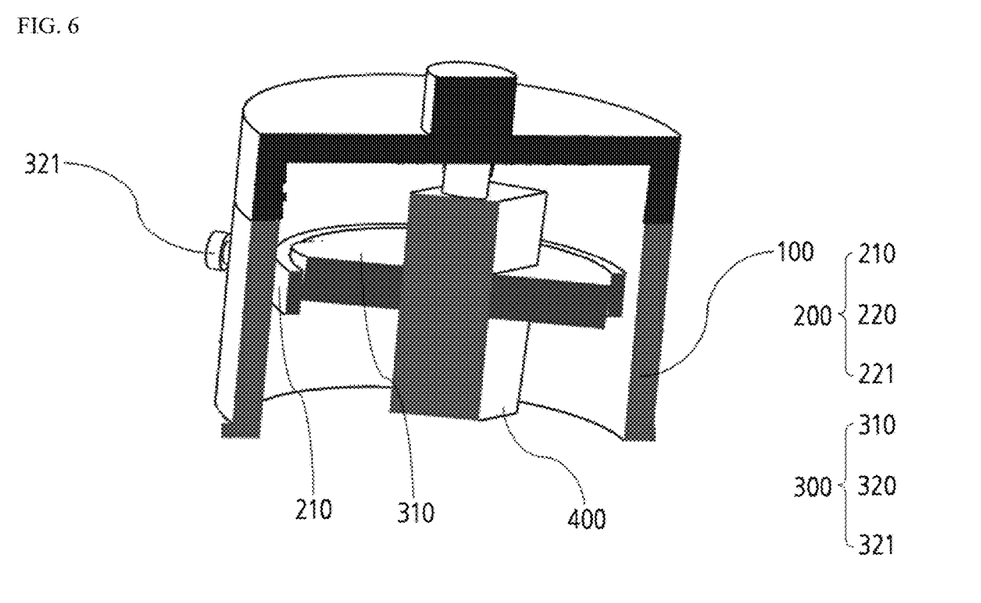
FIG. 6 illustrates the cross-section of the blood flow monitoring apparatus according to an embodiment of the present disclosure.
Figure 7:
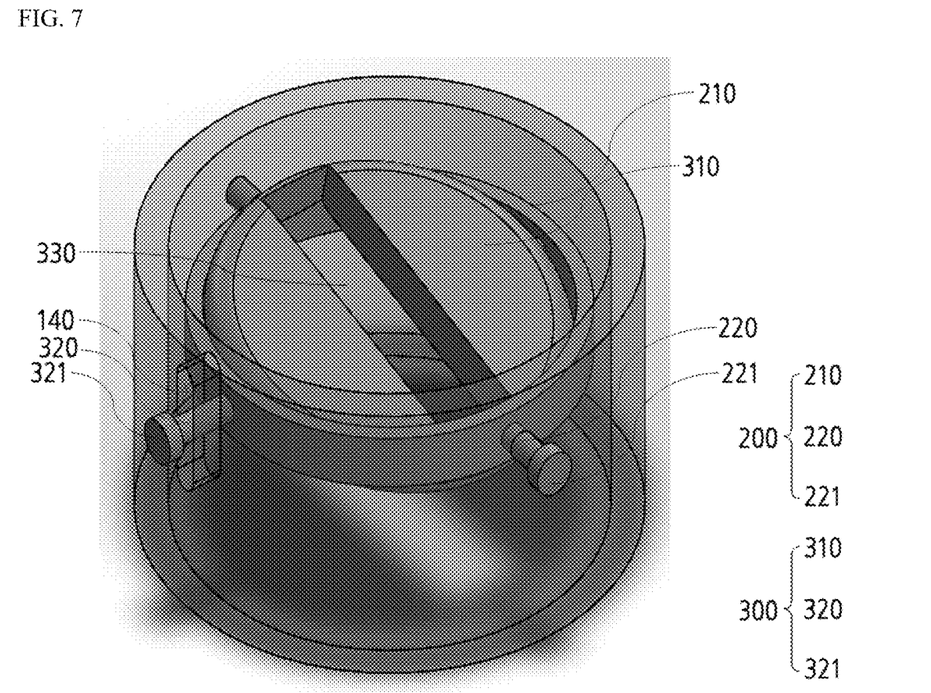
FIG. 7 illustrates the arrangement of a first rotation member and a second rotation member located inside the housing of the present disclosure.
Figure 8:
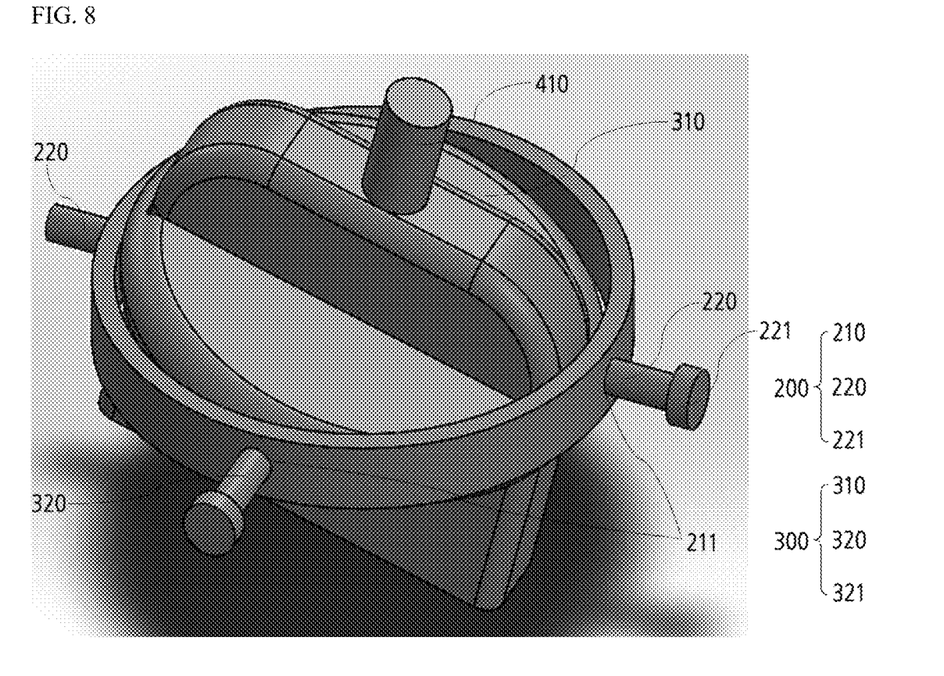
FIG. 8 illustrates the combined appearance of a probe module, the first rotation member, and the second rotation member of the present disclosure.

Referring to FIGS. 3 and 4, the housing 100 may include housing teeth 160 formed on the lower end of the housing 100. The housing teeth 160 may adjust the rotation angle of the housing 100 rotating about the third axis.

The blood flow monitoring apparatus 10 may include the patch part 500. An adhesive material may be applied to the patch part 500. A patch-part coupling hole 510 may be formed in the center of the patch part 500. Patch-part teeth 511 may be formed on the inner circumferential surface of the patch-part coupling hole 510.

The patch-part teeth 511 are coupled to the housing teeth 160, and as the housing 100 rotates about the third axis with respect to the patch part 500, the patch-part teeth 511 and the housing teeth 160 may rub. The housing 100 may rotate or stop rotating depending on the friction between the patch-part teeth 511 and the housing teeth 160.

Figure 9:
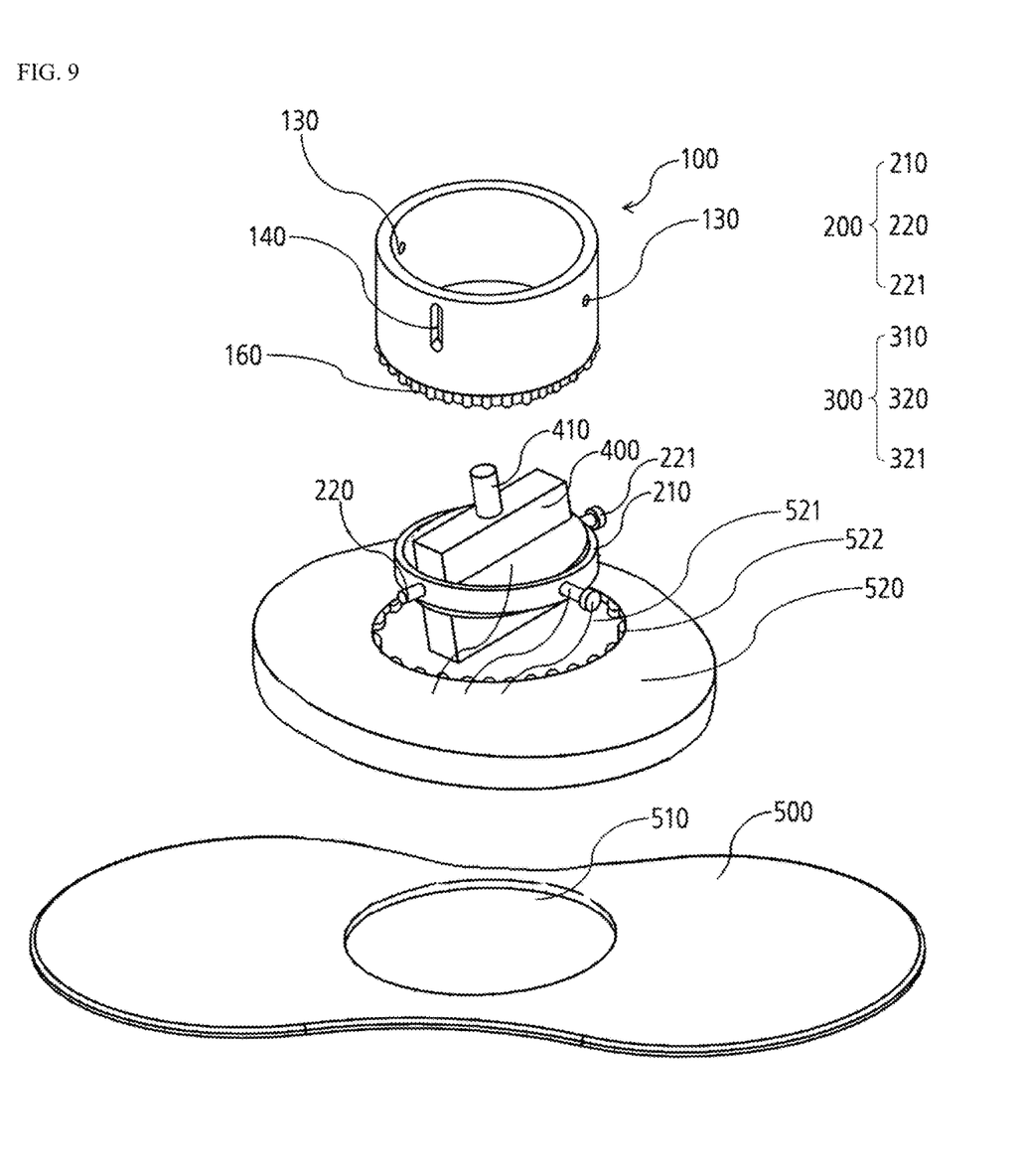
FIG. 9 illustrates a patch part separated from the blood flow monitoring apparatus of the present disclosure.

Referring to FIG. 9, the patch part 500 may include a patch-part adapter 520. The patch-part adapter 520 may be coupled to the patch part 500. An adapter coupling hole 521 may be formed in the patch-part adapter 520. Adapter teeth 522 may be formed on the inner circumferential surface of the adapter coupling hole 521. The adapter teeth 522 may be combined with the housing teeth 160 of the housing 100.

The adapter teeth 522 are coupled to the housing teeth 160, and as the housing 100 rotates about the third axis with respect to the patch part 500, the adapter teeth 522 and the housing teeth 160 may rub. The housing 100 may rotate or stop rotating depending on the friction between the adapter teeth 522 and the housing teeth 160.

Figure 10:
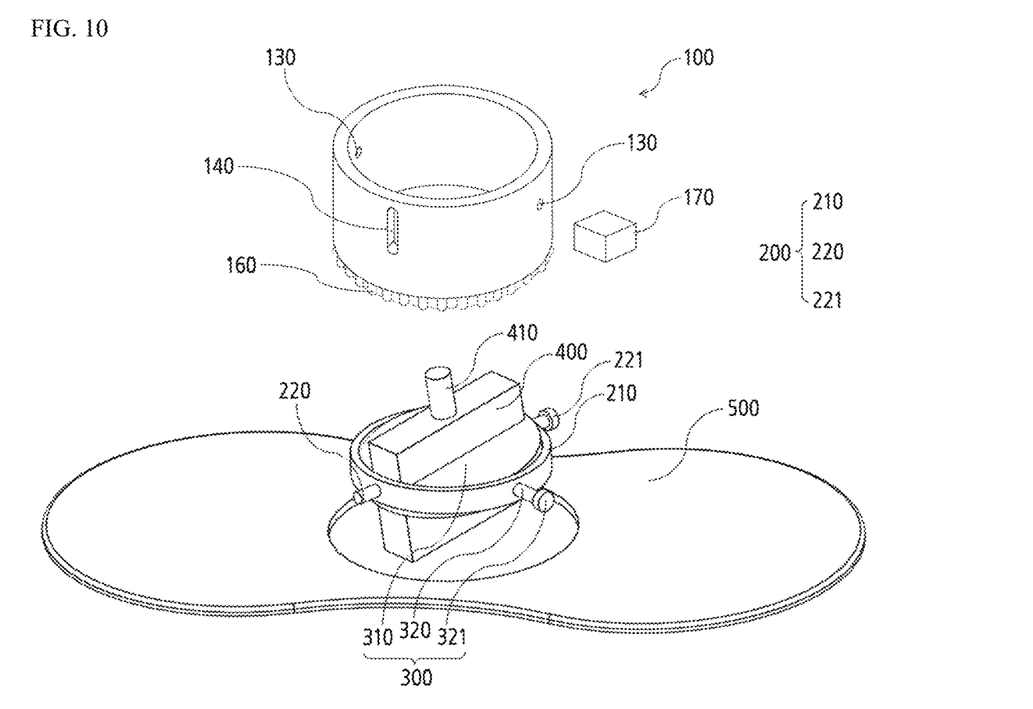
FIG. 10 is a perspective view of another embodiment of the blood flow monitoring apparatus of the present disclosure.

Referring to FIG. 10, a motor 170 may be placed on the patch part 500 or the patch-part adapter 520. The motor 170 may be fixed to the patch part 500 or the patch-part adapter 520 and coupled to the housing teeth 160. The motor 170 may operate by receiving a signal from the control part 610. The motor 170 may rotate the housing 100 with respect to the patch part 500 or the patch-part adapter 520.

The first rotation member 200 may be a member disposed inside the housing 100 and coupled to the first axial hole 130 to rotate about a first axis.

The first rotation member 200 may include a first rotating ring 210 with a ring shape and the first rotation axis member 220.

The first rotating ring 210 may be formed in a circular or polygonal ring shape to correspond to the cross-sectional shape of the housing 100, and may have the first rotation axis member 220 formed on each of opposite end parts thereof by protruding therefrom.

The first axis rotation member 220 may be formed to protrude perpendicularly from each of a first side surface and a second side surface of the first rotating ring 210 in a direction perpendicular to each side, and may be inserted and coupled to the first axial hole 130 formed in the housing 100.

A first manipulation member 221 may be coupled to an end part of the first rotation axis member 220. Since the first manipulation member 221 protrudes out of the housing 100, a user may hold the first manipulation member 221 by hand to rotate the first manipulation member 221, or the first manipulation member 221 may be rotated by combining with a rotary drive device (not shown). As the first manipulation member 221 rotates, the first rotating ring 210 may also rotate in the same direction as the first manipulation member 221.

The first manipulation member 221 is not limited to the shape of a polygonal column or a cylinder, but may be, for example, a gear with teeth formed along an outer peripheral surface thereof.

The first end of the first rotation axis member 220 may be connected to one side surface of the first rotating ring 210, and the second end thereof may be coupled to the first axial hole 130.

The extension lines of the central axes of the first rotation axis members 220 formed on the first side surface and second side surface of the first rotating ring 210 may be arranged on the same line, wherein the extension lines may pass through the center of the first rotating ring 210.

A plurality of second axial holes 211 may be formed in the first rotating ring 210. The second axial hole 211 may be formed in each of the first side surface and second side surface of the first rotating ring 210, and may be formed in a direction perpendicular to a position at which the first rotation axis member 220 is formed. Accordingly, a line perpendicular to the second axial hole 211 and the extension line of the central axis of the first rotation axis member 220 may intersect and be perpendicular to each other. An imaginary line connecting the plurality of second axial holes to each other may coincide with a second axis.

The second rotation member 300 may be coupled to the first rotation member 200, and may rotate about the second axis. The second axis may be an axis perpendicular to the first axis.

The second rotation member 300 may include a rotating plate 310, the second rotation axis member 320, and a probe coupling part 330.

The rotating plate 310 may be arranged inside the first rotating ring 210, and rotate about the second axis with respect to the first rotating ring 210.

A plurality of second rotation axis members 320 may be coupled to the rotating plate 310. The second rotation axis member 320 may be formed on each of first and second sides of the rotating plate 310, and may be inserted and coupled to the second axial hole 211.

The second rotation axis member 320 is disposed on the same line as the second axis, and may function as a rotation shaft so that the rotating plate 310 is able to rotate about the second axis.

At least a portion of the second rotation axis member 320 may protrude out of the housing 100 through the first long hole 140 of the housing 100. As the first rotation member 200 rotates while the second rotation axis member 320 slides in the first long hole 140, the second rotation member 300 also rotates about the first axis.

A second manipulation member 321 may be coupled to an end part of the second rotation axis member 320. Since the second manipulation member 321 protrudes out of the housing 100, a user may hold the second manipulation member 321 by hand to rotate the second manipulation member 321, or the second manipulation member 321 may be rotated by combining with the rotary drive device (not shown). As the second manipulation member 321 rotates, the rotating plate 310 may also rotate in the same direction as the second manipulation member 321.

The second manipulation member 321 is not limited to the shape of a polygonal column or a cylinder, but may be, for example, a gear with teeth formed along an outer peripheral surface thereof.

The first rotation member 200 may rotate about the first axis, the second rotation member 300 may rotate about the second axis, and the housing 100 may rotate about the third axis. The first rotation member 200, the second rotation member 300, and the housing 100 may rotate independently of each other. The first axis, the second axis, and the third axis may intersect and be orthogonal to each other.

The probe coupling part 330 may be formed on the rotating plate 310. The probe module 400 may be coupled to the probe coupling part 330.

The probe module 400 as a Doppler ultrasound sensor generates an ultrasound wave, transmits the ultrasound wave into the human body, and obtains a reflected signal to obtain information about the status of a continuous blood flow and a blood vessel.

When ultrasonic waves of a predetermined frequency are generated by the probe module 400, the ultrasonic waves of the frequency are incident on a target such as a blood vessel inside the human body, and a signal reflected from the target may be acquired through the probe module 400 and converted into an electrical signal.

Meanwhile, a Doppler ultrasound sensor may acquire data used for hemodynamic evaluation. That is, the Doppler ultrasound sensor may acquire various data on the status of a blood flow by using a spectral Doppler ultrasound examination method. Spectral Doppler examination may be performed using a continuous wave or a pulsed wave that sends ultrasonic waves at regular intervals. In particular, the continuous wave method may be useful in an area in which only one blood vessel exists in one cross-section.

Through this spectral Doppler examination, it is possible to know not only whether blood flow exists and the amount of blood flow, but also whether a blood vessel wall exists, peak systolic velocity, end diastolic velocity, acceleration time, and deceleration time of blood flow, and it is possible to obtain a lot of information about hemodynamics by measuring resistive index, pulsatility index, acceleration time index, and heart rate, etc. on the basis of on this information.

The probe module 400 may transmit an ultrasonic wave to the human body located under the housing 100 through the opening 120 and may receive an ultrasonic signal reflected from the human body. In the internal space of the housing 100, ultrasound gel may be coated between the probe module 400 and the human body.

A connection terminal 410 is connected to the probe module 400, provides power to the probe module 400, and may transmit an electrical signal generated by the probe module 400 from a reflected signal to the control part 600.

When the housing 100, the first rotation member 200, and the second rotation member 300 rotate the first axis, the second axis, and the third axis, respectively, the housing 100, the first rotation member 200, and the second rotation member 300 may rotate in the same direction, so the probe module 400 may probe the position of a blood vessel whose position is changeable within the human body, and may take an optimal angle for the discovered blood vessel to obtain a best ultrasound cross-sectional image.

The patch part 500 may be attached to a human skin and may stably fix the position of the housing 100 on the skin to which the patch part 500 is attached. The patch part 500 may be coupled to the lower end part of the housing 100. Referring to FIG. 9, the combination of the patch part 500 with the housing 100 may be performed through the patch-part adapter 520. The patch-part adapter 520 may be attached to the patch part 500, and may have the adapter teeth 522 inside. The housing teeth 160 may be formed on the lower end of the housing 100. The housing teeth 160 are in contact with the adapter teeth 522, and as the housing 100 rotates about the third axis, the housing teeth 160 and the adapter teeth 522 may rub against each other. The housing 100 may stop rotating whenever the housing teeth 160 are located in valleys between the adapter teeth 522.

Since one surface of the patch part 500 is coated with an adhesive that is harmless to the human body, the one surface of the patch part 500 may be easily attached to the skin of the human body.

The patch part 500 may be detachably combined with the housing 100, so the used patch part 500 can be easily separated from the housing 100 and disposed of.

The housing coupling hole 510 that is able to be coupled to the housing 100 may be formed in the patch part 500.

Figure 11:
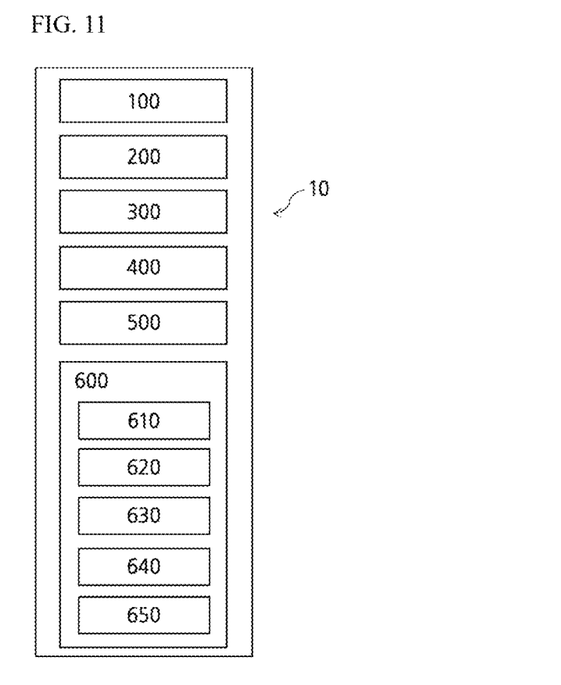
FIG. 11 schematically illustrates components included in the blood flow monitoring apparatus of the present disclosure.
Figure 12:
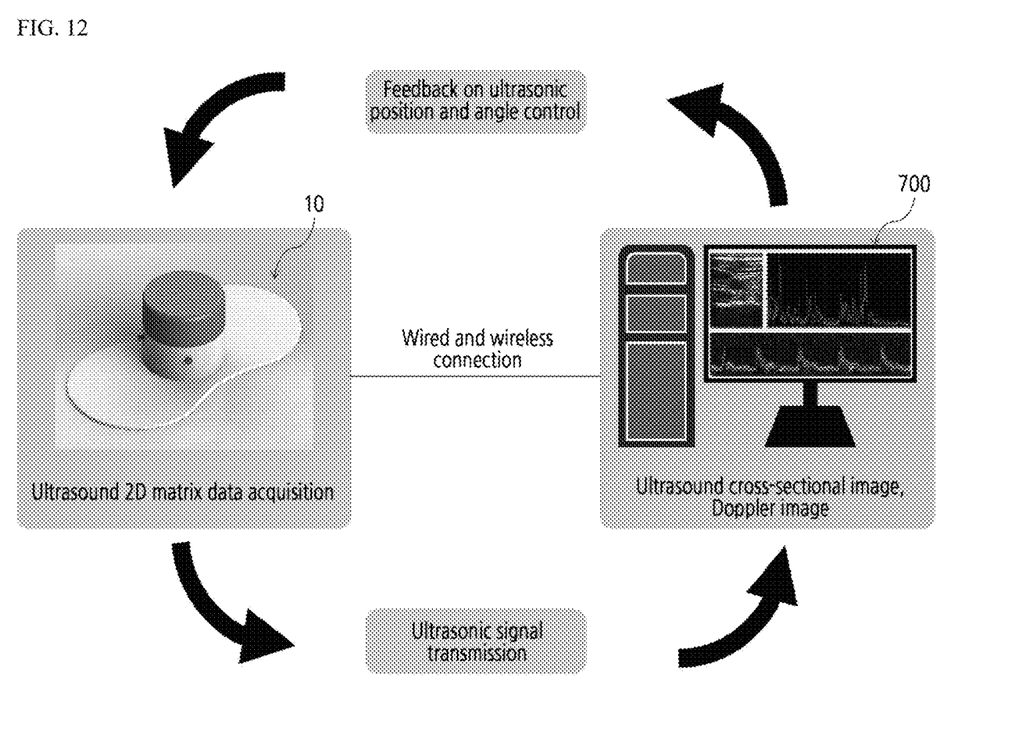
FIG. 12 schematically illustrates a blood flow monitoring system according to another embodiment of the present disclosure.
Figure 13:
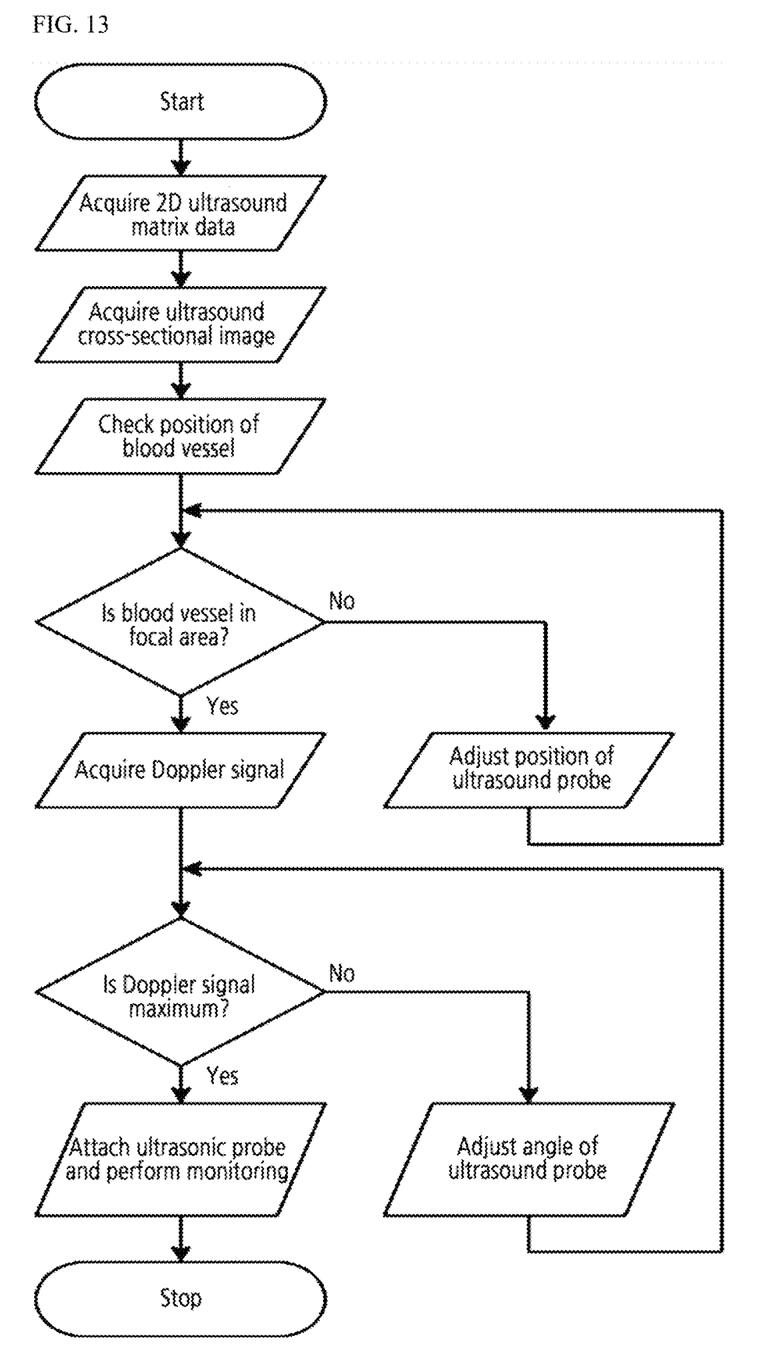
FIG. 13 illustrates the blood flow monitoring algorithm of the blood flow monitoring system according to another embodiment of the present disclosure.

Referring to FIGS. 11 to 13, the operation part 600 may be arranged on the upper part of the housing 100 and may control the overall operation of the blood flow monitoring apparatus. The operation part 600 may include the control part 610, a communication part 620, a calculation part 630, and a power supply part 640.

The operation part 600 may transmit an electrical signal generated by the probe module 400 through the connection terminal 410. The electrical signal may include ultrasonic signal data and ultrasonic 2D matrix data received by the probe module 400.

The control part 610 may control the rotation direction and rotation angle of the probe module 400 through the rotation direction and angle of the probe module 400, which is calculated by the calculation part 630, with respect to the first axis, the second axis, and the third axis.

The communication part 620 may transmit, by wire or wirelessly, an electric signal stored in the operation part 600 to an application installed on an external device or an external display 700, wherein the application may display ultrasound cross-sectional images and Doppler images. Additionally, the communication part 620 may transmit a control signal for controlling the control part 610 from the application to the control part 610. Therefore, a user may freely control the rotation angle of the probe module 400 through an external application.

In addition, the application may display ultrasound cross-sectional images and Doppler images on the display 700 through electrical signals transmitted through the communication part 620 and may continuously probe the image of a blood vessel through the displayed ultrasound cross-sectional images and Doppler images to transmit the position of the blood vessel to the calculation part 630 through the communication part 620.

The calculation part 630 may determine the position of the blood vessel transmitted through the application and thus may calculate the rotation direction and rotation angle of the probe module 400 with respect to the first axis, the second axis, and the third axis so that the probe module 400 may transmit and receive an ultrasonic signal for the position of the blood vessel at an optimal angle and maintain the sensitivity of a Doppler signal. The rotation direction and rotation angle calculated by the calculation part 630 are transmitted to the control part 610, so that the control part 610 may control the rotation direction and rotation angle of the probe module 400.

The power supply part 640 is equipped with a battery and may provide power to the probe module 400, the operation part 600, and other rotary drive devices.

An alarm part 650 may include an LED lamp, and may notify a user that a problem has occurred by emitting light in a specific color or by flashing at regular time intervals when the application does not find the image of a blood vessel for a predetermined period of time and the probe module 400 transmits and receives ultrasonic signals in a wrong direction.

The display 700 may be wirelessly connected to the communication part 620 of the blood flow monitoring apparatus 10, which is not limiting, but may be, for example, a smartphone, a laptop, a PC, a tablet, etc. The application 70 may be run on the display 700 and output on a screen.

The application may output ultrasound cross-sectional images and Doppler images, etc., through data such as ultrasound 2D matrix data, which the probe module 400 receives ultrasonic signals to be converted to. In addition, the application may probe the position of a blood vessel through the output pictures and images, and may analyze and output the status of the probed blood vessel (blood flow abnormality, a blood flow rate, thickness of a blood vessel wall, a pulsation index, circulatory resistance, heart rate, thrombosis, and stenosis, etc.).

The application stores object recognition learning results based on deep learning for a blood vessel, so the application may perform an object recognition function for the blood vessel recognized in acquired pictures and images. An object recognition method may be performed by a YOLO (you only look once) neural network architecture.

The application may transmit position information about the recognized blood vessel to the communication part 620, and the control part 610 may control the rotation angle of the probe module 400 with respect to the first axis, the second axis, and the third axis through the position information about the blood vessel transmitted to the communication part 620.

Although the present technology has been described through the above embodiments, the present technology is not limited thereto. The above embodiments may be modified or changed without departing from the spirit and scope of the present technology, and those skilled in the art will recognize that such modifications and changes also belong to the present technology.

The invention claimed is:

1. A blood flow monitoring apparatus comprising:
a housing having an opening formed in a lower surface thereof;
a first rotation member configured to rotate about a first axis inside the housing;
a second rotation member mounted to the first rotation member and configured to rotate about a second axis; and
a probe module mounted to the second rotation member,
wherein the first axis and the second axis are arranged to be orthogonal to each other within a same plane, and
wherein the probe module is configured to rotate together with the first rotation member and the second rotation member according to rotations of the first rotation member and the second rotation member and is capable of transmitting and receiving ultrasonic signals.

2. The blood flow monitoring apparatus of claim 1, wherein the blood flow monitoring apparatus further comprises a patch part,
wherein the patch part is attachable to skin, and the housing is coupled to the patch part and is rotatable about a third axis.

3. The blood flow monitoring apparatus of claim 2, wherein the first axis, the second axis, and the third axis are perpendicular to each other, and the housing, the first rotation member, and the second rotation member are capable of rotating independently of each other.

4. The blood flow monitoring apparatus of claim 3, wherein the blood flow monitoring apparatus further comprises a control part,
wherein the control part is capable of controlling rotation angles of the housing, the first rotation member, and the second rotation member.

5. The blood flow monitoring apparatus of claim 2, further comprising:
housing teeth formed on a lower end of the housing; and
a patch-part adapter arranged on the patch part,
wherein the patch-part adapter comprises adapter teeth formed in an adapter coupling hole thereof, and
wherein the housing teeth are in contact with the adapter teeth.

6. The blood flow monitoring apparatus of claim 2, wherein the blood flow monitoring apparatus further comprises an operation part,
wherein the operation part comprises a control part and a communication part,
wherein the control part is configured to control rotation angles of the housing, the first rotation member, and the second rotation member, and
wherein the communication part is capable of transmitting, by wire or wirelessly, data on the ultrasonic signals received by the probe module.

7. The blood flow monitoring apparatus of claim 1, wherein the first rotation member comprises a first rotating ring and a first rotation axis member,
wherein the housing has a first axial hole formed therein, and
wherein a first end of the first rotation axis member is connected to one side of the first rotating ring, and a second end thereof is coupled to the first axial hole.

8. The blood flow monitoring apparatus of claim 7, wherein the second rotation member comprises a rotating plate and a second rotation axis member,
wherein the rotating plate is arranged inside the first rotating ring,
wherein the first rotating ring has a second axial hole formed therein, and
wherein the second rotation axis member is formed on one side of the rotating plate and is coupled to the second axial hole.

9. The blood flow monitoring apparatus of claim 8, wherein a direction in which the second rotation axis member is arranged is orthogonal to a direction in which the first rotation axis member is arranged.

10. The blood flow monitoring apparatus of claim 8, wherein the housing has a first long hole formed in a vertical direction of the housing,
wherein the second rotation axis member protrudes through the first long hole, and
wherein the second rotation axis member is capable of sliding in the first long hole.

11. The blood flow monitoring apparatus of claim 10, wherein a second manipulation member is formed on an end part of the second rotation axis member.

12. A blood flow monitoring system comprising the blood flow monitoring apparatus of claim 1 and a display on which an application is installed, wherein the blood flow monitoring apparatus further comprises an operation part,
  wherein the operation part comprises a control part and a communication part,
  wherein the control part is configured to control rotation angles of the housing, the first rotation member, and the second rotation member,
  wherein the communication part is capable of transmitting, by wire or wirelessly, data on ultrasonic signals received by the probe module, and
  wherein the application is configured to receive the data on ultrasound signals transmitted by the communication part and to output ultrasound cross-sectional images and Doppler images on the display.

13. The blood flow monitoring system of claim 12, wherein the application stores deep learning-based object recognition learning results for a blood vessel and is capable of performing an object recognition function for the blood vessel in the ultrasound cross-sectional images and Doppler images.

14. The blood flow monitoring system of claim 13, wherein the application transmits position information about the blood vessel recognized from the ultrasound cross-sectional images and Doppler images to the communication part, and
  the control part is configured to control a rotation angle of the probe module through the transmitted position information about the blood vessel.

15. The blood flow monitoring apparatus of claim 1, wherein the same plane is not parallel to a vertical direction of the housing.

16. The blood flow monitoring apparatus of claim 1, wherein the first rotation member comprises a first rotating ring and a first rotation axis member,
  wherein the first rotation axis member is connected to one side of the first rotating ring, and
  wherein the same plane is parallel to a plane in which the first rotating ring lies.

17. The blood flow monitoring apparatus of claim 1, wherein the first rotation member comprises a first rotation axis member, and
  wherein the first rotation axis member is coupled to a first axial hole formed on a side surface of the housing.

* * * * *